US011374784B2

(12) United States Patent
Fargier

(10) Patent No.: US 11,374,784 B2
(45) Date of Patent: Jun. 28, 2022

(54) HOME-AUTOMATION SYSTEM FOR A BUILDING AND BUILDING COMPRISING SUCH A HOME-AUTOMATION SYSTEM

(71) Applicant: SOMFY ACTIVITES SA, Cluses (FR)

(72) Inventor: Sylvain Fargier, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 76 days.

(21) Appl. No.: 16/644,090

(22) PCT Filed: Sep. 3, 2018

(86) PCT No.: PCT/EP2018/073605

§ 371 (c)(1),
(2) Date: Mar. 3, 2020

(87) PCT Pub. No.: WO2019/043221

PCT Pub. Date: Mar. 7, 2019

(65) Prior Publication Data

US 2020/0195464 A1 Jun. 18, 2020

(30) Foreign Application Priority Data

Sep. 4, 2017 (FR) ...................................... 1758145

(51) Int. Cl.
*H04L 12/28* (2006.01)
*G05B 15/02* (2006.01)

(52) U.S. Cl.
CPC .......... *H04L 12/2832* (2013.01); *G05B 15/02* (2013.01); *H04L 12/2809* (2013.01);
(Continued)

(58) Field of Classification Search
CPC ............. H04L 12/2832; H04L 12/2809; H04L 12/2821; H04L 67/12; G05B 15/02;
(Continued)

(56) References Cited

U.S. PATENT DOCUMENTS 8,548,607 B1 * 10/2013 Belz .................. H02J 13/00002 700/21
2006/0126617 A1 6/2006 Cregg et al.
(Continued)

OTHER PUBLICATIONS

FR Search Report, dated Apr. 25, 2018, from corresponding FR application No. 1758145.
(Continued)

*Primary Examiner* — Kim T Nguyen
(74) *Attorney, Agent, or Firm* — Nixon & Vanderhye

(57) ABSTRACT

This home-automation system for a building comprises: home-automation equipment, distributed within areas of the building; and a communication network, to which the home-automation equipment is connected, and authorizing an inter-communication of the home-automation equipment according to a predefined communication protocol. The communication network is a hard-wired hierarchical network comprising: a first network of rank n; a plurality of sub-networks of lower hierarchical rank n−1, connected to the first network, each sub-network being associated with an area and containing at least one of the home-automation equipment items; each sub-network of the lower hierarchical rank n−1 being hooked up to the first network of rank n by a network equipment item.

17 Claims, 4 Drawing Sheets

CONTROL UNIT 12
4
BUILDING
2
-Z1-
-Z2-
-Z3-
-Z4-
NETWORK
-14-
SENSOR
CONTROL POINT 8
HOME AUTOMATION DEVICE
6
10

(52) U.S. Cl.
CPC .................... *H04L 12/2821* (2013.01); *G05B 2219/25011* (2013.01); *G05B 2219/2642* (2013.01)

(58) Field of Classification Search
CPC .. G05B 2219/25011; G05B 2219/2642; G05B 2219/25168; G05B 2219/163; E06B 9/00
See application file for complete search history.

(56) References Cited

U.S. PATENT DOCUMENTS

| | | | | |
|---|---|---|---|---|
| 2011/0213867 | A1 | 9/2011 | McCoy et al. | |
| 2014/0358285 | A1* | 12/2014 | Aggarwal ............ | H05B 47/175 700/275 |
| 2016/0095188 | A1 | 3/2016 | Verberkt et al. | |

OTHER PUBLICATIONS

Jia et al., "Context Driven Content Centric Networking for Smart Buildings", Proceedings of SPIE, 2016, Article No. 99020D, vol. 9902, XP060077581.
International Search Report, dated Oct. 11, 2018, from corresponding PCT application No. PCT/EP2018/073605.

* cited by examiner

HOME-AUTOMATION SYSTEM FOR A BUILDING AND BUILDING COMPRISING SUCH A HOME-AUTOMATION SYSTEM

BACKGROUND OF THE INVENTION

Field of the Invention

The present invention relates to a home automation system for a building as well as a building comprising such a home automation system.

More generally, the invention relates to the field of automated operations for buildings, both for commercial buildings and residential buildings, whether they are individual or collective.

Description of the Related Art

Many buildings exist that are provided with controllable electrical equipment seeking to perform comfort and energy management functions, such as heating, ventilation and air conditioning, but also management of the light and control of the opening frames, such as shutters or rolling blinds placed in front of the windows of the building or remote securing by controlling closing systems (doors, locks). The automated operations are the sets of rules that govern the control of the electrical equipment by a programmable supervision system, in order to ensure better comfort of the occupants of the building or to optimize energy consumption. These automated operations are referred to as "Building Automation Systems". In the residential sector, building automation systems are more often referred to as "home automation". For simplification purposes, the term "home automation" will be used hereinafter to refer to both residential and service sector applications.

Typically, the equipment items in a same building are connected to a control unit, which serves to supervise these equipment items and control their operation. This connection is often made by connecting the equipment items by dedicated wired connections. For example, each equipment item is connected directly to the control unit by means of one or several cables, according to a master/slave configuration.

Such a situation is not, however, always satisfactory, since the slightest modification of the home automation system or the operation of the equipment items requires recabling the system, which is expensive and complicated to carry out inasmuch as this requires using a specialized installer.

In other known systems, this connection is made by connecting the equipment items to a shared data bus, such as a multipoint bus authorizing a two-way connection, for example of type RS485. This data bus is coupled to the central unit, so as to form a network that authorizes the exchange of data among the equipment items and the control unit.

However, such a situation has drawbacks.

On the one hand, the installation of the system is more complicated, since the equipment items must each be configured manually in order to configure their operation and make them able to communicate over the network. It is therefore necessary to add, in addition to a cabling operation that is already cumbersome in itself, an entire network configuration phase that again requires the participation of specialized installers.

Additionally, to a certain extent, this situation also offers limited flexibility, since any modification after installation requires reconfiguring, or even recabling the network, whether by adding new equipment items or in order to modify their distribution in the building.

On the other hand, this known situation has limitations in terms of the number of equipment items that can be received in the network. For example, the solutions of type RS485 commonly used have limited addressing capabilities, and in practice only make it possible to connect a maximum of 255 individual equipment items on a same bus. This limit is prohibitive when it involves equipping large buildings and/or buildings comprising a large number of equipment items to be managed. Yet modern applications make it necessary to be able to manage a more or less large number of equipment items, for example in the context of the Internet of things or the so-called smart management of buildings.

Furthermore, the architecture of these known networks can lead to the appearance of substantial lag times during the communication between an equipment item and the control unit. This in particular can be explained by the fact that the control is centralized and the information emitted by the equipment items must escalate toward the bus to be processed in a centralized manner by the control unit. Yet for certain applications, too great a lag time can generate dissatisfaction in the user wishing to use the equipment item, or even be detrimental to the proper working of the equipment.

The invention more specifically aims to address these drawbacks by proposing a home automation system comprising an improved communication network that makes it possible to manage a large number of home automation equipment items more simply within a building while allowing better upgradability and usage flexibility than in the known solutions.

SUMMARY OF THE INVENTION

To that end, the invention relates to a home automation system for a building, this building being divided into several areas, the home automation system being characterized in that it includes:

- home automation equipment items, distributed within areas of the building, and
- a communication network, to which the home automation equipment items are connected, this communication network authorizing an intercommunication of the home automation equipment items according to a predefined communication protocol;

the communication network being a hardwired hierarchical network including:

- a first network of rank n,
- a plurality of subnetworks of lower hierarchical rank n−1, connected to the first network, each subnetwork being associated with an area of the building, each subnetwork containing at least one of the home automation equipment items;

each subnetwork of lower hierarchical rank n−1 being connected to the first network of rank n by a network equipment item, such as a router.

Owing to the invention, the communication network item makes it possible to manage a large number of home automation equipment items within the building, while having an increased installation and upgrade flexibility. The hierarchical communication network architecture makes it possible to manage a large number of equipment items, each equipment item being a communicating element of the home automation system, while having an increased installation and upgrade flexibility.

In such a hierarchical architecture, the system includes a main network of higher hierarchical level, and multiple subnetworks of lower hierarchical levels, connected by network equipment items, gateways or routers, to the subnetwork of rank higher than their own.

According to advantageous but optional aspects of the invention, such a system may incorporate one or more of the following features, considered alone or according to any technically allowable combination:

At least a part of the home automation equipment items of the communication network is configured to provide information to the other home automation equipment items with an adjustable diffusion range intended solely for the subnetwork of lower hierarchical rank n−1 in which it is located, or several of the subnetworks of lower hierarchical rank n−1 or the entirety of the network of rank n and subnetworks with rank n−1.

The network equipment item is configured to inhibit the propagation of information to the home automation equipment items of subnetworks of equal hierarchical rank if the adjustable diffusion range is a local range.

The network equipment item authorizes the propagation of information to the home automation equipment items of subnetworks of lower hierarchical rank if the adjustable diffusion range is a local range.

The communication protocol is the IP protocol, preferably the IPv6 protocol.

The network of hierarchical rank n is a main network comprising a common data bus, and in that among the subnetworks, at least a first of these subnetworks is connected to the main network by means of a network equipment item in the form of a connection gateway between the common data bus and the first hardwired subnetwork, the physical medium of the main network and the first subnetwork being different.

The common data bus is an Ethernet link.

The network of hierarchical rank n and the subnetworks of lower hierarchical rank n−1 comprise identical physical media, each of the subnetworks being connected to the network of hierarchical rank n by means of a network equipment item such as a router.

The home automation equipment items of a same subnetwork are interconnected using a physical link such as a multipoint data bus, preferably a wired link of type RS485.

The network equipment items and the home automation equipment items are each equipped with a network interface that connects them to the communication network, this network interface being programmed to implement a network stack according to the predefined communication protocol.

A home automation equipment item is a controllable home automation apparatus provided with a controllable actuator, or a control point, or a sensor.

According to another aspect, the invention relates to a building, for example for domestic, commercial or industrial use, comprising several areas and equipped with a home automation system comprising home automation equipment items distributed within areas of the building, the home automation system being as previously described.

According to another aspect, the invention relates to a method for configuring a home automation system as previously described, comprising the following steps:

Installing a control point having a predefined subnetwork broadcast range in a first subnetwork (SSN1, SSN2) of a communication network of the home automation system;

Sending, to the communication network, a first command in multicast mode from this control point;

Verifying that the first command applies only to the home automation equipment items of the first subnetwork, the configuration of the home automation system being considered incorrect otherwise;

Installing the control point in a second subnetwork with rank n, having a rank higher than the rank of the first subnetwork;

Sending, to the communication network, a second command in multicast mode from the control point;

Verifying that the second command applies to the elements of the second subnetwork with rank n as well as the elements of the subnetworks of rank lower than rank n, the configuration of the home automation system being considered incorrect otherwise.

BRIEF DESCRIPTION OF THE DRAWINGS

The invention will be better understood, and other advantages thereof will appear more clearly, in light of the following description of one embodiment of a home automation system for a building, provided solely as an example and done in reference to the appended drawings, in which.

DESCRIPTION OF THE PREFERRED EMBODIMENTS

Figure 1:
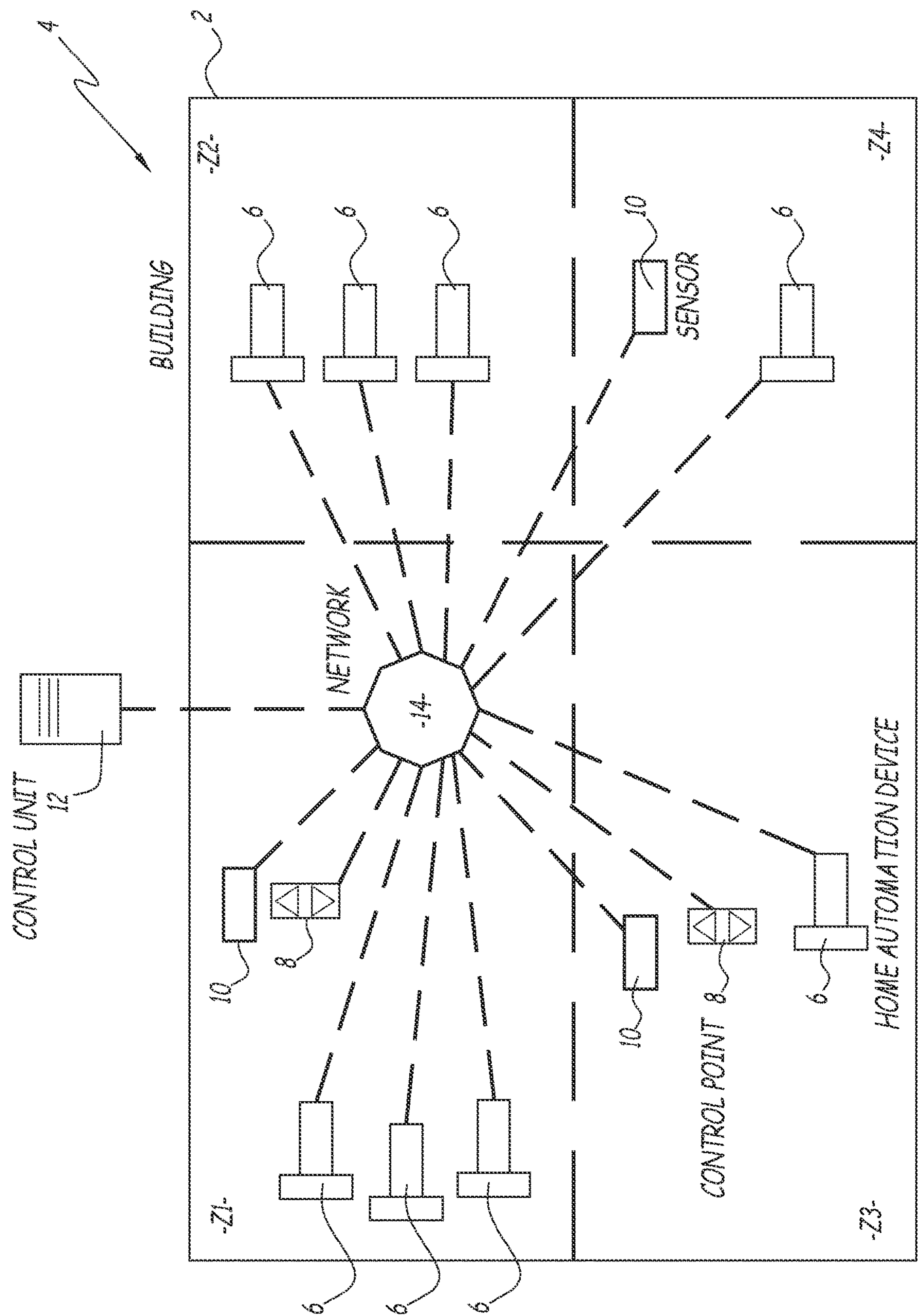
FIG. 1 is a schematic illustration of a building comprising a home automation system according to the invention.

FIG. 1 shows a building 2, comprising several areas Z1, Z2, Z3, Z4. The building 2 is equipped with a home automation system 4 that includes a set of home automation equipment items distributed in the areas of the building 2, as well as a control system for these home automation equipment items.

The home automation system 4 here is intended to procure comfort and energy management functions of the building 2, such as the heating, ventilation and air conditioning, as well as management functions for the lighting and control of the opening frames, such as shutters or rolling blinds placed in front of windows of the building 2 and/or security functions such as monitoring of the premises and the alarm.

The set of home automation equipment items comprises home automation equipment items such as controllable home automation apparatuses 6, control points 8 and sensors 10, able to perform the above functions.

The control system in particular includes a programmable control unit 12 and a communication network 14, inside the building 2, the communication network 14 being arranged to allow the communication of the home automation equipment items of the home automation system 4 with one another and with the control unit 12. The home automation equipment items of the home automation system 4 that are connected to this communication network 14 are said, hereinafter, to belong to the communication network 14.

The home automation equipment items and the control system here are connected to one or several electric power sources, not illustrated, of the building 2.

The areas of the building 2 correspond to portions of the building 2 that are located inside and/or outside this building and that are intended each to receive part of the home automation equipment items of the home automation system 4.

The building 2 can be a set of offices, or a building for residential use, or a building for commercial or industrial use, or any combination of these uses. It can in particular be a multi-unit building or an individual house.

Thus, within the meaning of the present disclosure, the term "home automation" is not limited to purely domestic and residential use.

For example, areas of the building 2 correspond to levels of the building 2, such as floors or basements. These areas can also be rooms, groups of rooms of the building 2, optionally separated from one another by partitions, these rooms being able to be distributed within one or several levels of the building 2.

These areas can be delimited independently of the physical structure of the building 2. For example, a same room of the building 2 can include several areas. Such areas can also be located outside the building 2, for example when they correspond to a façade or a façade portion of the building 2. These areas can also correspond to façades or façade portions, such a façade portion corresponding to a same floor.

These areas are for example defined during the design of the building 2 and/or during the design and/or the installation of the home automation system 4.

Preferably, the areas of the building 2 are separate from one another. However, in a variant, areas of the building 2 can intersect and/or be interleaved with one another.

In this example, only four areas, here denoted Z1, Z2, Z3 and Z4, are defined in reference to the building 2. However, in practice, this number can be different. It is in particular adapted as a function of the configuration of the building 2 and functions of the home automation system 4.

To simplify FIG. 1, the areas Z1, Z2, Z3 and Z4 are illustrated schematically inside a same floor of the building 2.

Preferably, each controllable home automation apparatus 6 includes an actuator controllable using at least one control signal.

The home automation apparatuses 6 here are illustrated identically. However, they can have differences relative to one another and perform different functions within the home automation system 4.

For example, the actuator of the apparatus 6 comprises an electric motor, the actuator acting on a mechanical load and arranged to move and/or adjust an element of the building 2.

According to one example, the mechanical load of the apparatus 6 is a concealing blind, such as a panel, a shutter or an opaque curtain, associated with at least one opening of the building 2, such as a window or a bay window. The movement of this concealing blind makes it possible to regulate the quantity of sunshine received by the building 2 through this opening.

According to another example, the mechanical load of the apparatus 6 is a compressor configured to carry out an expansion-compression cycle of a heat transfer fluid within a refrigeration system of the building 2, such as an air conditioner or a heat pump, in order to regulate the temperature inside the building 2.

According to still another example, the mechanical load of the apparatus 6 is a pump or a fan configured to set a volume of fluid in motion within the building 2, for example to suction or blow air within a ventilation system, or to circulate water or a heat transfer fluid within a dedicated duct.

In a variant, the actuator of the apparatus 6 can control an electric switching device, in order to control the illumination and extinction of a light source, such as a neon or light-emitting diode light, within the building 2.

The controllable home automation apparatus 6 can also be a light, for example an inside light, outside light, or a lighting control system, an alarm system, or a video camera, in particular a video surveillance camera.

A control point 8 is intended to receive control instructions from a user of the building 2, so as to control, directly or indirectly, one or several of the controllable home automation apparatuses 6 and/or to control the control unit 12.

To that end, each control point 8 here controls a man-machine interface, not illustrated, comprising data entry means, such as one or several switches and/or one or several pushbuttons and/or one or several rotary buttons and/or a touchscreen. The control point 8 can also include a connection interface for connecting external control means, for example one or several individual switches positioned around the control point 8 and connected to the latter by a wired link.

The man-machine interface of the control point 8 can also include display means, such as lighted indicators and/or an electronic screen, for example with liquid crystals, in order to display, to the user, information relative to the operation of the home automation system 4 or instructions entered on said man-machine interface.

The control points 8 can assume the form of a portable remote control associated with a fixed receiver or, in a variant, a fixed control terminal secured to a wall of the building 2.

Here again, the control points 8 are illustrated here identically, but they can have differences relative to one another and perform different functions within the home automation system 4.

Each sensor 10 is designed to convert one or several physical properties relative to the state of the building 2 or its environment into one or several signals proportional to this physical property. This signal is for example an electric signal, a light signal or a radiofrequency signal. This signal can be transmitted by the sensor to at least one home automation equipment item and/or control system, for example, the control unit 12.

One or several sensors 10 can be integrated into a controllable home automation apparatus 6, a control point 8 or the control unit 14. The home automation installation 4 can comprise one or several sensors independent from these elements.

For example, the physical properties measured by the sensors 10 are, non-limitingly, a temperature, for example a temperature of a wall or the ambient air, a humidity level, a brightness value, or a pressure of the ambient air, a consumption value for example of water, gas or electricity, the opening state of a rolling shutter, the position of an opening frame such as a window, which may or may not be motorized, or the presence or absence of a user.

Here again, the sensors 10 are illustrated here identically, but can have differences relative to one another within the home automation system 4.

Generally, each home automation equipment item comprises a network interface 40, which allows it to communicate over the network 14 and which will be defined later in the disclosure.

As an illustrative example, in FIG. 1, the zone Z1 includes three home automation apparatuses 6, a control point 8 and a sensor 10. The area Z2 includes three home automation apparatuses 6. The area Z3 includes a home automation apparatus 6, a control point 8 and a sensor 10. The area Z4 includes a home automation apparatus 6 and a sensor 10.

For example, the three controllable home automation apparatuses 6 of the area Z2 are suitable for moving the concealing blinds equipping openings of the building 2 arranged at this area Z2. Still in this example, the home automation apparatuses 6 of the area Z1 here are part of an air conditioning and refrigeration system of the air circulating in the area Z1. Their operation is regulated as a function of control orders received by the control point 8 and as a function of a temperature measured by the sensor 10 located in this area Z1.

Each home automation equipment item of the home automation system 4, in particular including the controllable home automation apparatuses 6, the control points 8 and the sensors 10, is connected to the control unit 12 via the communication network 14 and to that end includes a network interface 40 for connecting to this communication network 14. The control unit 12 also includes a network interface 40.

For example, each home automation apparatus 6 receives control signals by means of the communication network 14. Each control point 8 transmits the control instructions received by means of the communication network 14. Each sensor 10 sends the measured information by means of the communication network 14.

The communication is done according to a given communication protocol.

This communication is done here by an exchange of messages, for example in the form of packets, these messages each containing a header, which includes a destination of the message, and useful data, such as a command order or a physical property value measured by a sensor. Preferably, the communication protocol used is an IP protocol (Internet Protocol), for example the IPv6 protocol. In a variant, the communication protocol is the IPv4 protocol.

Figure 2:
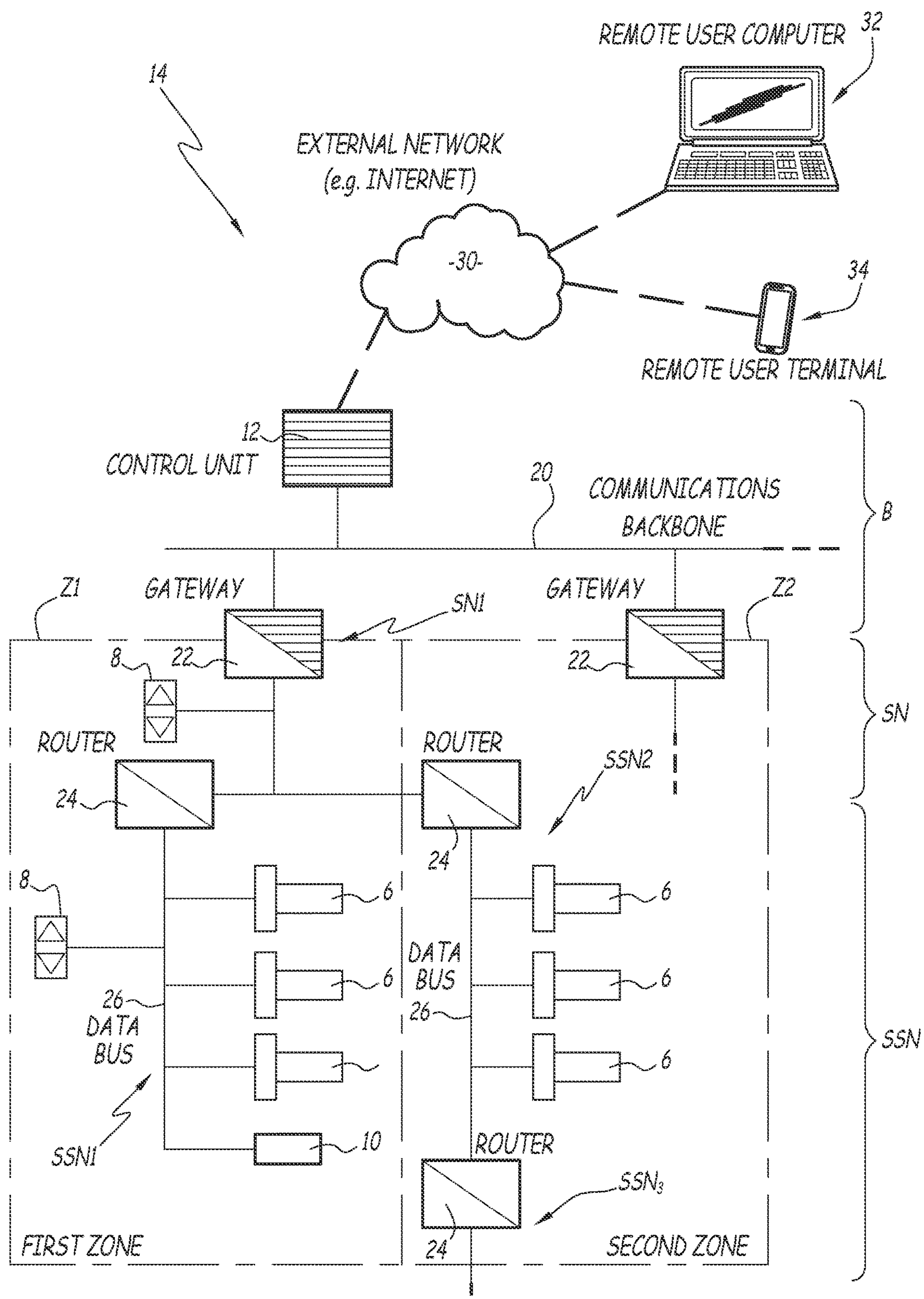
FIG. 2 is a schematic illustration of a communication network of the home automation system of FIG. 1 for connecting equipment items of the home automation system.

FIG. 2 shows a more detailed example of the communication network 14. To facilitate the reading of this FIG. 2, the home automation equipment items associated with the areas Z3 and Z4 of the building 2 are not illustrated.

The communication network 14 is a hierarchical network with several hierarchy levels, also called ranks. It includes a main network B, which in particular includes a common data bus 20, forming a backbone 20, to which the control unit 12 is connected. For example, the backbone 20 is a hard-wired link of the Ethernet type, for example Ethernet 100 Mbit/s or greater.

This main network B is identified here by an identifier, denoted GRP, which is incorporated into the network address of each communicating element belonging to this network B.

The network 14 also includes at least one subnetwork, generically denoted by reference SN. This subnetwork includes a network equipment item 22, 24, which is connected to the backbone 20 and which forms a head of this subnetwork SN. It may be an interconnected network equipment item, also called gateway 22, configured to interconnect two separate network portions, for example, with different technologies. It may also be a router 24 when the main network B and the subnetwork SN are of the same nature. The gateways and the routers have similar functionalities, with the difference that the router does not convert the data transmission formats. These two network equipment items are intermediate elements of the communication network 14 performing the routing of the packets. Their role is to cause packets to pass from one network interface 40 to another according to a set of rules forming a routing table. In the example of FIG. 2, two gateways 22 are connected to the backbone 20, thus forming two separate subnetworks. Only one of these two subnetworks, bearing reference SN1, is described hereinafter.

In a variant, the number of subnetworks SN can be different.

The subnetworks SN are directly connected to the main network via gateways, and have an associated first rank in the hierarchical network.

Each subnetwork SN contains at least one home automation equipment item 6, 8, 10 of the home automation system 4, connected to the corresponding gateway 22 via a physical link 26, which is preferably hard-wired.

The communication network 14 further includes sub-subnetworks of rank lower than that of the subnetworks SN, and are generically denoted by the reference SSN.

Each subnetwork SN is identified here by an identifier SID, which here is incorporated into the network address of each element belonging to this subnetwork SN.

Each subnetwork SN contains at least one home automation equipment item of the home automation system 4, connected to the corresponding network equipment item 22 via a physical link, which is preferably hard-wired.

Each subnetwork SN of rank n advantageously contains one or several subnetworks of lower rank, called rank "n−1", within which home automation equipment items of the subnetwork SN are distributed. Each subnetwork of lower rank, which is called sub-subnetwork and generically denoted by reference SSN, advantageously includes a router 24 here forming a head of this subnetwork SSN of lower rank. The router 24 here is connected to the network equipment item 22 via a physical link, which is preferably hard-wired.

Within the meaning of the present disclosure, a router is a hardware and software tool forming an intermediate element in a network and steering data between one and several parts of the network. The direction given to the data, or routing, is done according to a set of rules forming a routing table. A gateway is a specific router, which also performs, in addition to routing functions, a function of translating messages circulating on the network, inasmuch as the physical means and/or protocols differ between two network portions.

Each subnetwork of lower rank SSN thus includes one or several home automation equipment items, connected to the corresponding router 24 by means of a physical link 26 and owing to their respective network interfaces 40. The equipment items connected to a same router 24 here are said to be part of a same local subnetwork.

Each subnetwork SSN is identified here by an identifier SSID, which here is incorporated into the network address of each communicating element belonging to this subnetwork SSN.

Optionally, each subnetwork SSN can include one or several subnetworks of still lower rank, here generically denoted by reference SSSN.

Each of these subnetworks SSSN here has a structure similar to that of the subnetworks SN or SSN, such that the above description can be applied to them. For example, each subnetwork SSSN includes a router 24 that is connected to a subnetwork SSN of higher rank and includes home automation equipment items that are connected to this router 24 by means of a physical link similar to the link 26.

The network 14 can also include other subnetworks SSSN of still lower rank.

Thus, the communication network 14 is a hierarchical network, that is to say, it has a hierarchical structure, with subnetworks of different rank that may be interleaved with one another.

For example, the network 14 may include up to nine or ten layers, or ranks, of different subnetworks connected to the main network B.

The home automation equipment items of the home automation system 4 that are connected to this communication network 14 are said, hereinafter, to belong to the communication network 14. Each of the home automation equipment items of the system 4 connected at a subnetwork SN, SSN or SSSN belongs to this subnetwork SN, SSN or SSSN.

The subnetworks SN, SSN and SSSN can each be associated with an area of the building 2.

A subnetwork SN, SSN or SSSN is said to be "associated" with an area Z1, Z2, Z3, Z4 of the building 2 when the home automation equipment items 6, 8, 10 belonging to this subnetwork are in turn associated with this area, for example because they are physically located inside this area Z1, Z2, Z3, Z4 of the building 2.

In the illustrated example, each subnetwork SSN is associated with such an area Z1, Z2, Z3, Z4 of the building 2.

More specifically, in the example of FIG. 2, the subnetwork SN1 contains a control point 8, as well as two subnetworks of lower rank, denoted SSN1 and SSN2 and also called first and second subnetworks, respectively including a first router 24 and a second router 24. The first and second router organize the network into subnetworks, the router forming the head of the subnetwork and thus forming a network topology. A network topology thus corresponds to the (physical or logic) architecture thereof, defining the connections between the equipment items of the network and any hierarchy between them.

The first subnetwork SSN1 contains a control point 8 as well as two home automation apparatuses 6 and a sensor 10, connected to the first router 24 by a physical link 26, such as a multipoint data bus. This first subnetwork SSN1 is associated with the area Z1 previously described. The control point 8, the apparatuses 6 and the sensor 10 are therefore those previously described as belonging to the area Z1.

Similarly, the second subnetwork SSN2 here contains three home automation apparatuses 6, connected to the second router 24 by a physical link 26. This second subsubnetwork SSN2 is associated with the area Z2 previously described. These apparatuses 6 are therefore those previously described as belonging to the area Z2.

In a variant, the networks SN, SSN and SSSN can be different in number and/or include home automation elements other than those illustrated here.

The number and the structure of the subnetworks SN, SSN, SSSN, as well as their association with the areas of the building 2, are preferably chosen as a function of the configuration of the building 2 and functionalities fulfilled by the home automation system 4.

As an illustration and non-limitingly, a subnetwork SN is associated with a floor of the building 2, the subnetworks SSN of lower rank n−1 attached to this subnetwork SN are each associated with a room of this floor of the building 2, and the subnetworks SSSN attached to each of these subnetworks SSN are each associated with a portion of one of the rooms, or associated with the same room but bringing together apparatuses 6 of the same type: one subnetwork SSSN for the apparatuses 6 governing the lighting in this room, one for the apparatuses 6 controlling the concealing blinds associated with the windows of this room, one for the apparatuses 6 seeing to the operation of the air conditioning in this room.

In this example, the physical link that connects each network equipment item 22 to the home automation equipment items and the routers 24 is a multipoint serial data bus of type RS485, also known under the name EIA-485. Likewise, the physical links 26 here are multipoint data buses of type RS485.

Since the number of home automation equipment items connected within a subnetwork SSN is reduced relative to the total number of home automation equipment items in the entire system 4, the choice of a link of type RS485 is not prohibitive here, unlike the case where all of the home automation equipment items of the system 4 would be connected to such an RS485 data bus.

The use of a physical link 26 of type RS485 has advantages in this communication network 14, since it makes it possible to use long data buses, for example up to 1 km long, without overly deteriorating the quality of the signal circulating therein. The limitation of the number of home automation equipment items 6, 8, 10 and/or network equipment items 22, 24 connected on a same physical link 26 is not penalizing, owing to the hierarchical architecture that makes it possible to interconnect a large number of subnetworks.

Optionally, the control unit 12 is configured to be connected to an outside data network 30, such as the Internet, independently of the communication network 14. In FIG. 2, the gateways 22 are interconnected network equipment items between an Ethernet data bus and a RS485 data bus.

In this way, the control unit 12 can communicate with a remote computer server connected to this outside network 30, for example to send reports on the operating state of the system 4 for diagnostic purposes, or to receive control instructions. The control unit 12 can also communicate by this outside network 30 with one or several remote users provided with computers 32 or mobile communication terminals 34 such as smartphone apparatuses, or touch-sensitive tablets or any other equivalent equipment.

The communication network 14 is suitable for working according to a predefined communication protocol, such as the IP protocol, in order to provide communication between the communicating elements of the system 4 that are connected to this network 14, these elements in particular including the home automation equipment items previously defined, and network equipment items such as the gateways 22 and the routers 24. The network 14 is preferably compatible with the IPv6 protocol.

This communication protocol here is implemented using network interfaces that equip the various elements of the system 4 that here are connected by the network 14, in particular owing to the network interfaces 40 with which the home automation equipment items are provided and owing to the corresponding network interfaces of the network equipment items, such as gateways 22 and routers 24. For example, these network interfaces each implement a protocol stack, that is to say, a set of protocol layers, each protocol layer basing itself on those below it in order to provide additional functionality.

Figure 3:
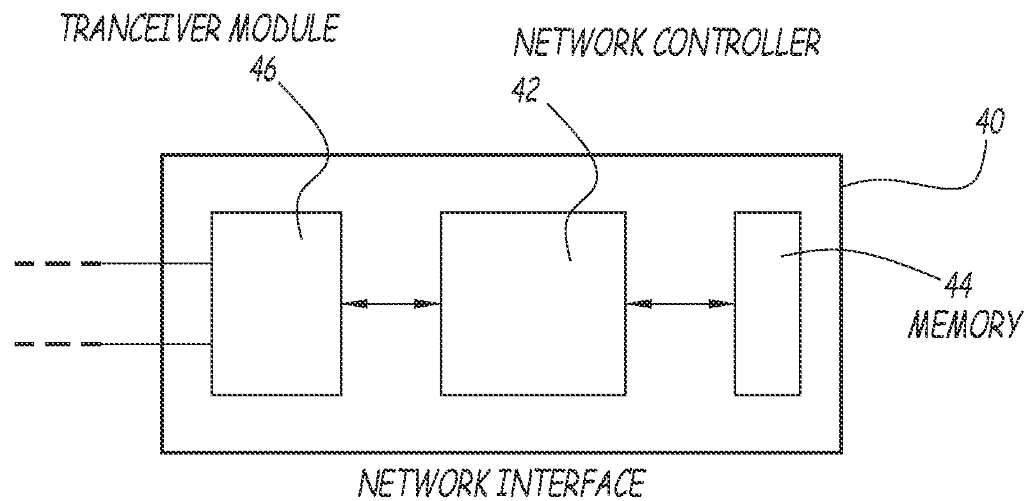
FIG. 3 is a schematic illustration of a network interface used in equipment items of the home automation system belonging to the communication network of FIG. 2.

FIG. 3 schematically shows the network interface of a communicating element. The network interface of a communicating element serves to connect this communicating element to one or several communication networks. It thus allows it to communicate with the other communicating elements of the network(s) to which it is connected.

As illustrated in FIG. 3, each network interface 40 includes a network controller 42, a computer memory 44 and a transceiver module 46, this module 46 here being provided with a connector that physically connects it to a physical layer of the network 14.

In this example, the physical layer of the network 14 is partially formed by the links 26.

In a known manner, the controller 42 includes an electronic computer programmed to process data passing through the network 14 and the connector 46.

For example, the controller 42 is programmed to automatically process the data received on the connector 46 and intended for it, in particular to extract and decode the content of received packets and to send this content to the home automation equipment item with which it is associated. In a complementary manner, the controller 42 is programmed to automatically prepare the data emitted by the home automation equipment item with which it is associated, in order to send it to one or several home automation equipment items connected to the network 14.

The memory 44 here contains a network address 50, a network address portion or at least one identifier, not illustrated, making it possible to uniquely identify the interface 40 on the network 14 and which therefore identifies the corresponding home automation equipment item on the network 4. The network interface 40 here is compatible with the IPv6 standard. For simplification reasons, it is mentioned in the disclosure that the network address identifies the home automation equipment item, or the corresponding network equipment item.

Furthermore, the memory 44 advantageously contains program code instructions that are executable to ensure the operation previously described of the controller 42.

The data buses of type RS485, used here in particular to form the physical link 26, each include a pair of conductive wires, which are preferably twisted. In order to transmit data on this bus, a carrier signal is emitted, preferably in the form of an electric voltage between this pair of conductive wires, this voltage being able to assume predefined values so as to encode a piece of information, for example in a binary manner. The shape of the carrier signal is for example defined by standard TIA/EIA-485-A.

In this example, the link 26 is a two-way link of the "half-duplex" type. In a variant, however, it may be a link of the "full-duplex" type. In this case, the module 46 is modified accordingly.

The data transfer speed authorized by the link 26, or binary throughput, here is less than or equal to 200 kbps.

Figure 4:
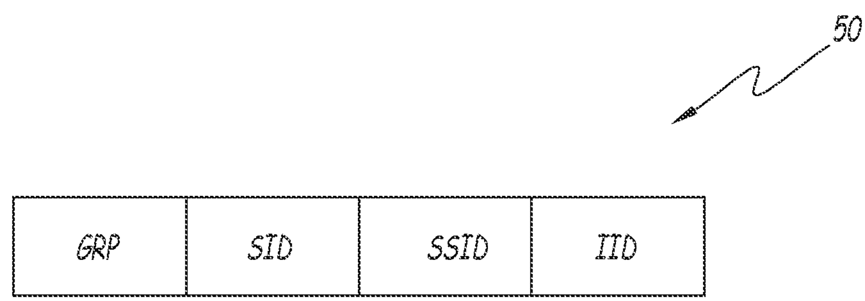
FIG. 4 is a schematic illustration of an exemplary network address structure for identifying the equipment items of the communication network of FIG. 2.

FIG. 4 shows an exemplary network address 50 associated with an equipment item connected to the network 14. This network address 50 here includes four components:

- the identifier IID that is uniquely associated with the home automation equipment item associated with this network interface 40;
- the identifier or prefix GRP that identifies the communication network as a whole, to which said equipment item belongs;
- the identifier SID of the subnetwork SN to which said equipment item belongs;
- if applicable, the identifier SSID of the subnetwork SSN or SSSN of lower level to which said equipment item belongs.

This network address 50 for example assumes the form of a numerical value, within which the values of the identifiers IID, GRP, SID and SSID are concatenated, according to a predefined structure. For example, the network address 50 is an IP address, preferably of type IPv6.

Figure 5:
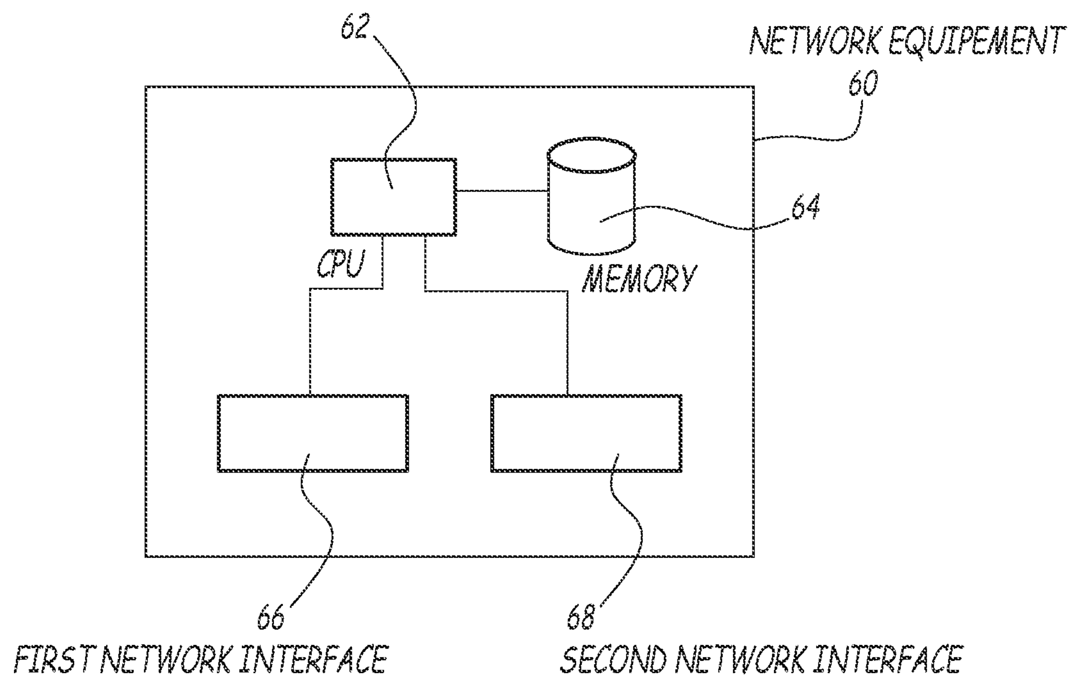
FIG. 5 is a schematic illustration of a network equipment item used in the communication network of FIG. 2.

FIG. 5 schematically shows a generic network equipment item 60 intended to be used in the network 14. The equipment items 60 for example corresponds to the router 24.

This equipment item 60 includes an electronic computer 62, a computer memory 64, a first network interface 66 and a second network interface 68. The interface 66 is for example intended to be connected to a first subnetwork, while the interface 68 is intended to be connected to a second subnetwork, of lower rank than the first subnetwork. The network interfaces 66, 68 are for example each physically similar to the interface 40. The device 60 includes at least one network address 50 that identifies each interface at least within the subnetwork to which it is intended to be connected. The electronic computer 62 is in particular programmed to ensure routing of the data packets arriving from the network portion associated with one or the other of the interfaces 66 or 68 toward an accessible network portion through the other network interface 66 or 68, as a function in particular of the destination of these data packets. The transmission of the information through the router in particular depends on the topology (or geometry) of the network, the configuration of the communicating equipment items and the pairing relationships between equipment items. For example, the equipment items 60 may include a routing table, for example generated from network addresses associated with the interfaces and/or recorded within the memory 64.

For example, for the router 24, the interfaces 66 and 68 here are compatible with the data buses of type RS485.

The gateway 22 has an operation similar to that of the equipment item 60 described above. Here, the network interface 66 is connected with the backbone 20 and the gateway also performs a function of translating messages circulating over the network, inasmuch as the physical means and/or the protocols differ between the backbone and the branches of the subnetworks.

The communication protocol used by the communication network 14 makes it possible to ensure the addressing of the messages exchanged between the communicating elements of the system 4, including when no pairing has yet been defined. This makes it possible to test the operation of the network 14 over the course of its creation.

For example, in a configured hierarchical network, the different pairings between equipment items having to communicate with one another having been done, when an element of the system 4, such as a control point, must send data to another communicating element of the system 4 with which it is paired, such as a first home automation apparatus 6, then the control point generates a message containing the data to be sent and containing the network address 50 of the first home automation apparatus as recipient element. The message is thus sent within the network 14 until it reaches its destination. More specifically, the message intended for a local equipment item belonging to the same subnetwork travels via the bus 26. The message intended for an equipment item located outside the subnetwork is routed using the router 24 associated with that subnetwork, which reorients it toward the corresponding subnetwork, optionally by means of one or several routers, one or several gateways 22 and the backbone 20.

In particular, the network 14 is in particular configured to authorize a communication of the "multicast" type between the communicating elements of the network 14, and in particular between the home automation equipment items of the system 4.

More specifically, in multicast mode, a communicating element of the network sends a message simultaneously to a group to which one or several communicating elements of the network may be subscribed. A multicast message sent over the network 14 also has a field comprising a broadcast range configuration, preferably assigned by default. This range allows the communicating elements to be operational including in the absence of established pairings.

This range configuration may assume several specific values:

Local range, that of the subnetwork,

Range of the subnetworks of equal or lower rank,

Site range, the entire network 14.

This range is for example defined by specific values associated with the range configuration field, the network interfaces of the various components of the network 14 and in particular network equipment items 22, 24 then being programmed to recognize such an address and to redirect or not redirect the messages accordingly.

Another field of a message emitted over the network can also comprise a maximum routing number, that is to say, the maximum number of routers that the message passes through between a communicating element sending a message and its recipient(s). Upon each router passage, the value of this field is decremented.

The choice of the IPv6 protocol is preferred for the network 14, since this protocol natively implements such a multicast mode. However, the network 14 could also use a KNX protocol, or in general, any protocol supporting group addressing and a such diffusion range.

For example, a same control point 8 can be used to control the equipment of a single area or several areas of the building 2, such as a room of this building 2, or an entire floor of the building 2, simply by modifying its position in the network or by modifying the range of the message sent by this control point 8 over the network 14, without being constrained by the limitations of the data buses conventionally used. The network can also be used without the pairings between the home automation equipment items having been done.

For example, when the control point 8 of the subnetwork SSN1 is operating in multicast mode, then, depending on the selected range of the message, it sends a message either to all of the home automation equipment items in its group, that is to say, of the subnetwork SSN1, or to all of the home automation equipment items of the subnetwork SN, or to all of the home automation equipment items of the network 14 as well as to the central unit 12.

Alternatively for a same local range value for example, if the control point 8 is positioned in a first subnetwork SN1, the message emitted by the control point 8 will be received by the equipment items of the first subnetwork SN1. If it is positioned in a second subnetwork SN2, the message will be received by the equipment items of the second subnetwork SN2.

For a same subnetwork range value for example, if the control point 8 is positioned in a first subnetwork SN1, the message emitted by the control point 8 will be received by the equipment items of the first subnetwork SN1 and by the equipment items of any subnetworks of lower rank than the subnetwork SN1. If it is positioned in a second subnetwork SN2, the message will be received by the equipment items of the second subnetwork SN2 and by the equipment items of the subnetwork(s) of lower rank than the subnetwork SN2. If it is positioned in the subnetwork SN, the message will be received by the equipment items of the first subnetwork SN1, the equipment items of the subnetwork SN2 and by the equipment items of the subnetwork(s) of lower rank than the subnetwork(s) SN1 and SN2.

Since the subnetworks are associated with areas of the building 2, by monitoring the diffusion of a message within the subnetworks, owing to the range of the messages, it is easy to control the diffusion of the messages geographically in the building intended for different home automation equipment items of the system 4, and it is easy to modify the operation of the network without changing the physical architecture thereof.

In other words, the functionality of the system 4 is partially defined by the physical architecture of the network 14, the logic architecture being able to be modified in a simplified manner after the installation, for example in order to add new subnetworks and/or to modify the existing subnetworks.

Thus, owing to the invention, the behavior of an equipment item can be defined by the manner in which the communication network is hardwired during its installation and can be modified even after the hardwiring has been installed, without modifying the hardwired connection of the equipment item in the network.

For example, if new home automation equipment items are installed in a room of the building 2 after the installation of the system 4, for example concealing blinds to protect openings of the building 2, then these new equipment items can be connected in an existing subnetwork or can be connected to a new router 24 in order to form a new subnetwork. This new subnetwork is in turn connected to the main network B or to an existing subnetwork SN, SSN, SSSN and is therefore part of the network 14.

The multicast communication described above is not limited to the control points 8 and also applies to the other home automation equipment items of the system 4 connected to the network 14, in particular to the sensors. For example, a sensor 10 can send the measured data to various home automation equipment items of the system 4, in the case where their operation has been programmed as depending on properties measured by the sensor 10. This can for example, non-exhaustively, relate to the case of concealing blinds whose triggering depends on the sunshine in the building 2, or an air conditioner whose triggering depends on the temperature of a room of the building 2.

The network 14 also makes it possible to lift the limitation of the known systems regarding the maximum number of equipment items able to be connected. Indeed, the home automation equipment items are connected within subnetworks, the number of which can be multiplied depending on the needs, by adding gateways 22 and/or routers 24. Even when a data bus such as a multipoint data bus of type RS485 is used to form a link 26 connecting the home automation equipment items within one of the subnetworks, this is also only restrictive in the known systems, since here only a small portion of the home automation equipment items of the system 4 is connected on this data bus 26.

The home automation equipment items of the system 4 are advantageously preconfigured with a range defined by default when they leave the plant prior to their installation during the placement of the system 4. This allows the installer first not to have to worry about anything other than placing the cables and placing the home automation equipment items according to the topology associated with the architecture of the building. Additionally, during the installation of the system 4, owing to this pre-configuration, the installer has the option of testing the default behavior of the subnetworks before finalizing the installation, in particular by using local control points temporarily installed in the network, which reduces the installation time.

For example, a configuration method of such a home automation system comprises the following steps:

First, a control point 8 having a predefined subnetwork broadcast range is installed in a first subnetwork of the communication network 14, for example the subnetwork SSN1. This installation here is temporary.

Next, a first command is sent in multicast mode from this control point 8. This first command for example includes a test message intended to be sent over part of the communication network 14. For example, the control point 8 is preconfigured with a default diffusion range predefined as being a local range. Thus, the command is considered only to be sent to the equipment items of the first subnetwork SSN1.

It is next verified that the first command applies only to the home automation equipment items of the first subnetwork SSN1. This verification is for example done automatically, directly or indirectly, for example by reading state variables of the home automation equipment items that are representative of the state of the home automation equipment items of the first subnetwork SSN1.

At this stage, if the first command applies to home automation equipment items other than those of the first subnetwork SSN1, this then indicates an incorrect configuration of the system 4. The same is true if the first command does not apply to all of the home automation equipment items of the first subnetwork SSN1.

Otherwise, if the first command applies correctly, then the control point 8 is next installed in a second subnetwork SN of rank n, that is to say, having a rank higher than the rank of the first subnetwork SSN1. For example, the control point 8 is uninstalled from the first subnetwork in order to be installed, here temporarily, in this second subnetwork SN.

Next, a second command is sent in multicast mode from the control point 8 henceforth installed in this second subnetwork SN. Here again, the control point 8 is preconfigured with a default diffusion range set as being a local range.

It is then verified that the second command applies to the elements of the second subnetwork SN with rank n as well as the elements of the subnetworks SSN1, SSN2, SSSN of rank lower than rank n. This can be done in a manner similar to the previous verification.

At this stage, if the second command applies to elements other than those of the aforementioned networks and subnetworks, or on the contrary, does not apply to all of these elements, then this indicates an incorrect configuration of the system 4. Otherwise, the operation is considered to be normal. The installation of the system 4 can continue.

The embodiments and alternatives and embodiments considered above may be combined to create new embodiments.

The invention claimed is:

1. A home automation system for a building that is divided into multiple areas, the home automation system comprising:

home automation equipment items, distributed within the multiple areas of the building; and a communication network to which the home automation equipment items are connected, said communication network authorizing an intercommunication of the home automation equipment items according to a predefined communication protocol, wherein the communication network is a hardwired hierarchical network including:

a first network of hierarchical rank n, and a plurality of subnetworks of hierarchical rank n−1 and connected to the first network, each subnetwork of the plurality of subnetworks being associated with an area of said multiple areas of the building, each subnetwork of the plurality of subnetworks containing at least one of the home automation equipment items, each subnetwork of the plurality of subnetworks being connected to the first network by a network equipment item, and wherein each among at least a portion of the home automation equipment items is configured to provide information to other ones of the home automation equipment items with a broadcast range adjustable by selection between:

(a) a broadcast range of solely a subnetwork of the plurality of subnetworks in which the home automation equipment item is located, (b) a broadcast range of plural ones of the subnetworks of the plurality of subnetworks, and (c) a broadcast range of the first network and all the subnetworks of the plurality of subnetworks.

2. The home automation system of claim 1, wherein the network equipment item is configured to inhibit propagation of information to home automation equipment items of subnetworks of a same hierarchical rank if the broadcast range is a local range.

3. The home automation system of claim 2, wherein the network equipment item authorizes propagation of information to home automation equipment items of subnetworks of hierarchical rank lower than rank n if the broadcast range is a local range.

4. The home automation system of claim 2, wherein the predefined communication protocol is IP protocol.

5. The home automation system of claim 2, wherein the first network is a main network comprising a common data bus, and wherein at least a first subnetwork of said plurality of subnetworks is connected to the main network by means of a connection gateway between the common data bus and the first subnetwork, a physical medium of the main network and the first subnetwork being different.

6. The home automation system of claim 1, wherein the network equipment item authorizes the propagation of information to home automation equipment items of subnetworks of hierarchical rank lower than rank n if the broadcast range is a local range.

7. The home automation system of claim 6, wherein the predefined communication protocol is IP protocol.

8. The home automation system of claim 1, wherein the predefined communication protocol is IP protocol.

9. The home automation system of claim 1, wherein the first network is a main network comprising a common data bus, and wherein at least a first subnetwork of said plurality of subnetworks is connected to the main network by means of a connection gateway between the common data bus and the first subnetwork, a physical medium of the main network and the first subnetwork being different.

10. The home automation system of claim 9, wherein the common data bus is an Ethernet link.

11. The home automation system of claim 1, wherein the first network and the plurality of subnetworks comprise identical physical media.

12. The home automation system of claim 11, wherein the home automation equipment items of a same subnetwork of the plurality of subnetworks are interconnected using a wired physical link.

13. The home automation system of claim 12, wherein the wired physical link is a multipoint data bus.

14. The home automation system of claim 1, wherein the network equipment item of each subnetwork of the plurality of subnetworks, and the home automation equipment items, are each equipped with a network interface that connects to the communication network, said network interface being programmed to implement a network stack according to the predefined communication protocol.

15. The home automation system according to claim 1, wherein a home automation equipment item is a controllable home automation apparatus provided with a controllable actuator, or a control point, or a sensor.

16. A building that includes plural areas and equipped with a home automation system comprising home automation equipment items, distributed within the plural areas of the building, and a communication network to which the home automation equipment items are connected, said communication network authorizing an intercommunication of the home automation equipment items according to a predefined communication protocol, wherein the communication network is a hardwired hierarchical network including:

a first network of hierarchical rank n, and a plurality of subnetworks of hierarchical rank n−1 and connected to the first network, each subnetwork of the plurality of subnetworks being associated with an area of said plural areas of the building, each subnetwork of the plurality of subnetworks containing at least one of the home automation equipment items, each subnetwork of the plurality of subnetworks being connected to the first network by a network equipment item, and wherein each among at least a portion of the home automation equipment items is configured to provide information to other ones of the home automation equipment items with a broadcast range adjustable by selection between:

(a) a broadcast range of solely a subnetwork of the plurality of subnetworks in which the home automation equipment item is located, (b) a broadcast range of plural ones of the subnetworks of the plurality of subnetworks, and (c) a broadcast range of the first network and all the subnetworks of the plurality of subnetworks.

17. A configuration method for configuring a home automation system that comprises home automation equipment items, distributed within areas of a building and a communication network to which the home automation equipment items are connected, said communication network authorizing an intercommunication of the home automation equipment items according to a predefined communication protocol, the communication network being a hardwired hierarchical network including:

a first network of hierarchical rank n, and a plurality of subnetworks of hierarchical rank n−1 and connected to the first network, each subnetwork of the plurality of subnetworks being associated with an area of said areas of the building, each subnetwork of the plurality of subnetworks containing at least one of the home automation equipment items, each subnetwork of the plurality of subnetworks being connected to the first network by a network equipment item, and each among at least a portion of the home automation equipment items configured to provide information to other ones of the home automation equipment items with a broadcast range adjustable by selection between:

(a) a broadcast range of solely a subnetwork of the plurality of subnetworks in which the home automation equipment item is located, (b) a broadcast range of plural ones of the subnetworks of the plurality of subnetworks, and (c) a broadcast range of the first network and all the subnetworks of the plurality of subnetworks, the configuration method comprising:

installing a control point having a predefined subnetwork diffusion range in a first subnetwork of the plurality of subnetworks;

sending, to the communication network, a first command in multicast mode from the control point;

verifying that the first command applies only to home automation equipment items of the first subnetwork, a configuration of the home automation system being considered incorrect otherwise;

installing the control point in a second subnetwork of the plurality of subnetworks, the second subnetwork having a hierarchical rank n higher than a rank of the first subnetwork;

sending, to the communication network, a second command in multicast mode from the control point; and verifying that the second command applies to elements of the second subnetwork as well as elements of subnetworks of rank lower than rank n, the configuration of the home automation system being considered incorrect otherwise.

* * * * *